United States Patent Office 2,967,542
Patented Jan. 10, 1961

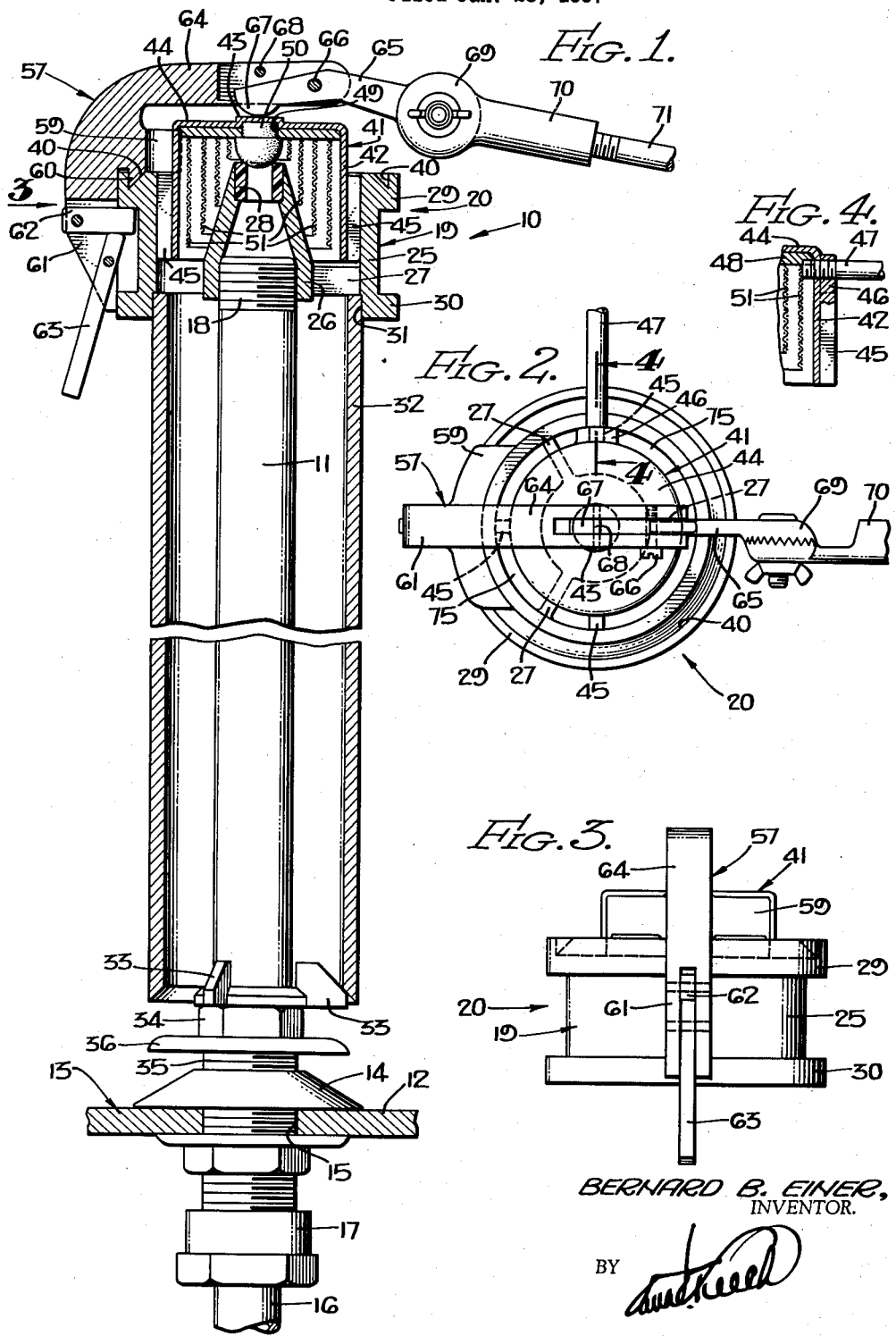

2,967,542

AIR-FLOW BALL COCK

Bernard B. Einer, 3445 E. Colorado St., Pasadena, Calif.

Filed Jan. 28, 1957, Ser. No. 636,718

10 Claims. (Cl. 137—437)

This invention relates to valves and is particularly useful as a float controlled valve for governing the admission of water to a flush tank.

The broad objects of the present invention include the provision of a pressure reducing valve which receives fluid under high pressure and is adapted to discharge said fluid into a vessel at a relatively low velocity; the provision of a valve controlling the discharge of fluid held under high pressure which will perform the function of mixing a gas with the discharged fluid; the provision of a valve which will mix a gas with a fluid and simultaneously change the direction and greatly reduce the speed of the fluid; and the provision of a valve which is simple in design and in which the parts subject to wear are few in number and are readily accessible for replacement by unskilled labor.

Water enters a flush tank through a high-pressure line having a valve, located high within the tank. A hollow copper ball floating on the surface of the water in the tank gradually closes this valve as the tank is filled with water and opens this valve when water is drained from the tank. Water is generally delivered from the inlet valve through a water pipe which discharges the incoming water downwardly close to the bottom of the tank.

Water gravitates from the tank through a large hole in the bottom thereof near its center. This hole is closed by a hollow rubber discharge valve ball which is mounted on the lower end of a light guide rod. The float ball is lifted by this rod to start the discharge of water through the discharge hole and it allows the float ball to rise by its buoyancy to the surface of the water, the guide rod thus being caused to slide upwardly through suitable guides provided therefor, which also loosely guide the float ball as it drops downwardly, with the lowering of the water level in the tank, to keep the float ball in alignment with its seat surrounding the discharge hole.

The means for thus vertically guiding the float ball onto its seat is sometimes interfered with by the stream of incoming water rapidly flowing across the bottom of the tank just as the latter is being emptied and which is produced by the stream of water discharged downwardly against the bottom of the tank from the inlet tube. The impingement of this stream of water upon the descending discharge valve float ball tends to msialign this with its seat, sometimes causing it to hang up on the valve seat, so as to prevent the discharge valve closing until the guide rod is manually reactuated to free the float ball and allow it to Le properly seated. This is a constant source of annoyance and causes a very considerable wastage of water.

It is an object of the present invention to provide a valve which is expressly adapted for use as the inlet valve of a flush tank and which embodies means for delivering water admitted to the tank by this valve at a low level in the tank in such a manner that this water will not form a stream across the bottom of the tank having the tendency to cause the discharge valve float ball to hang up as above noted.

A tremendous amount of engineering developement work has been directed towards solving the problem of reducing the noise produced in the operation of flush tanks and it is another object of the present invention to produce an inlet valve for a flush tank which will be relatively quiet in operation.

Yet another object of the invention is to provide a flush tank inlet valve which will require relatively little service and have a long operating life.

In view of the limited space afforded within a flush tank for working on the operating mechanisms required therein, it is of considerable importance that any device provided for installation in a flush tank should occupy as small a space as possible.

It is yet another object of the invention to provide an inlet pipe valve having a pipe for discharging water passing through said valve which is of substantially increased capacity and yet which occupies a relatively small space in addition to that required by the other equipment in the tank.

Because the pressure water system for domestic supplies of water are frequently used for the fighting of fires which sometimes decreases the water pressure in the mains to the point where the water drains downwardly out of the water supply systems in tall buildings, it is necessary to provide against the siphoning of water from flush tanks through the inlet control valves and into the water supply system.

It is an object of the present invention to provide a valve controlling the admission of water from the pressure water supply system into a flush tank which will be relatively proof against the siphoning of water from the flush tank back into the supply system when a vacuum occurs in the latter.

It is customary practice to equip every flush tank with an overflow pipe and to connect the upper end of the inlet pipe with said overflow pipe by what is termed a refill pipe. This is generally a small diameter pipe made of copper. As the location of the inlet valve in the flush tank varies in different installations, it is necessary in some instances to bend the refill pipe so that it may lead from the inlet valve to the overflow pipe.

It is a yet further object of the present invention to provide an inlet valve unit for controlling the admission of water to a flush tank in which the refill pipe is mounted on a rotatable element of the valve which may be turned in various directions about the vertical axis of the valve to permit the refill pipe to extend from the valve in alignment with the overflow pipe to thereby eliminate the necessity for bending the refill pipe to accomplish this.

Another object of the invention is to provide a flush tank ball cock in which the float fulcrum is applicable to the valve body with the float lever arm extending in any desired horizontal angle from the valve; and in which the fulcrum may be readily removed and replaced without tools; and in which the removal of said fulcrum frees the valve member for removal and repair or replacement.

The manner of accomplishing the foregoing objects as well as further objects and advantages will be made manifest in the following description taken in connection with the accompanying drawings in which:

Fig. 1 is a vertical sectional fragmentary view of a preferred embodiment of the invention comprising a ball cock valve connected with a domestic water system for delivering water under high pressure to a flush tank.

Fig. 2 is a plan view of Fig. 1.

Fig. 3 is a rear elevational view taken in the direction of arrow 3 in Fig. 1.

Fig. 4 is a fragmentary cross-sectional view taken on the line 4—4 of Fig. 2.

Referring specifically to the drawings, the invention is there shown for illustrative purposes as embodied in a flush tank ball-cock-valve-and-discharge-tube assembly 10 which is mounted on the upper end of a water supply pipe 11 which passes upwardly through the bottom 12 of a flush tank 13 and is rigidly secured to said bottom by a fitting 14 which is mounted in a hole 15 provided in said bottom. The pipe 11 is connected to a domestic pressure-water system by a pipe 16 which is secured to said fitting by a bonnet 17. The pipe 11 extends vertically upwardly in the flush tank 13 to a point near the top of the tank where it is provided with threads 18 on which housing body 19 of a flush tank ball cock 20 is secured so as to permanently mount said body on pipe 11 in coaxial relation therewith.

The body 19 includes a tubular housing shell 25 and a valve seat base 26 which is coaxial with said shell and joined integrally therewith by three radial webs 27.

The valve seat base 26 is hollow and internally threaded to screw onto the threads 18 and tapers upwardly with its upper end concentrically recessed to receive a tubular valve seat 28 with a drive fit. The seat 28 is preferably made of a corrosion proof material such as stainless steel or a synthetic resin, such as nylon.

The shell 25 is cylindrical with external annular flanges 29 and 30 at its upper and lower ends. At its lower end, shell 25 is recessed concentrically at 31 to receive the upper end of a delivery tube 32. This tube is often referred to as a hush tube as it serves to confine the water released thereinto from the cock 20 so that this is quietly delivered downwardly from tube 32 into the flush tank 13. This tube surrounds pipe 11 and is supported at its lower end by a three-legged spider 33 which rests on a nut 34 screwed onto threads 35 on the lower end of pipe 11. The nut 34 is provided with a water spreading flange 36 the purpose of which will be made clear later.

Formed concentrically in the top face of shell 25 is an annular groove 40 with a triangular cross section and a vertical outer face.

Vertically sliable in the upper portion of shell 25 is a valve closure member 41. This member includes an inverted cylindrical cup 42 having an internally recessed wear boss 43 on the bottom 44 thereof and four guide flanges 45 extending radially from the cup side wall. One of these flanges has a boss 46, near the cup bottom 44, in which a tapped hole is provided for screwing a threaded end of a refill pipe 47.

Fitting upwardly into the inverted cup 42 so as to lie against the bottom 44 and be trapped in this position by the inner end of pipe 47 (see Fig. 4) is a plate 48 having a central hole 49 for receiving a rivet-shaped valve button 50. This button is preferably made of a soft synthetic rubber such as neoprene.

Secured as by soldering to plate 48 are four concentric doubled, wire-mesh tubular screens 51 which progressively increase in length from the innermost outwardly, so that the group of screens 51 approximately occupies the tapering space of progressively decreasing cross sectional area, lying between the cup 42 and the valve seat base 26.

Detachably secured to the shell 25 is a valve control lever fulcrum mount 57. This comprises a clamp having a shell sector overlying jaw 59, from which an arcuate hook 60 extends downwardly into groove 40, and a bifurcated arm 61 within which are pivoted a movable clamp jaw 62 and a jaw actuating cam lever 63.

When positioned as shown in Fig. 1, lever 63 cams jaw 62 up against flange 29 and locks mount 57 in a given position on the shell 25. When lever 63 is swung outwardly, however, this unlocks mount 57, allowing it to be removed from shell 25 or shifted and reset thereon in any desired differently oriented position relative to the valve axis.

The arm 61 has an upward and inward extension 64 an end portion of which is bifurcated to pivotally mount a valve control lever 65 on a pin 66. The inner end of lever 65 has a rounded cam head 67 which is positioned to engage the wear boss 43 at its center regardless of the rotational orientation of the mount 57 on the shell 25. A stop pin 58 limits the upward swinging of the lever head 67.

Adjustably secured to lever 65 through a serrated jaw clamp 69 is a float rod socket 70 which threadedly receives a float rod 71, on the outer end of which a valve controlling float (not shown) is mounted.

*Operation*

When employed as a flush tank ball cock as shown in the drawings, the invention operates to admit water into the flush tank 13 whenever the float rod 71 is lowered by the flushing of water from the tank.

The valve button 50 rises, of course, with the valve member 41 as downward pressure against this by the lever 65 relaxes. Water, confined under high pressure in pipe 11, escapes at once from between seats 28 and valve button 50 in a radiating fan of water impinging successively on the concentric wire screens 51. These function to reduce the velocity of the stream of water and prevent the development of noise in its flow from the point of its escape from pipe 11 to the point where it is delivered downward into the upper end of delivery tube 32.

The ball cock 20 of the present invention possesses the great advantage of being proof against siphoning water from the flush tank 13 back into the pipe 11 when a vacuum develops in said pipe. This assurance derives from the fact that valve closure member 41 always returns downward by gravity to be supported by valve button 50 resting on valve seat 28 in concentric closing relation therewith.

The occurrence of a vacuum in the pipe 11 can only take place when the button 50 is thus closing the valve seat 28 and the vacuum only causes the button 50 to be pressed harder in closing relation with the seat.

In the remote possibility, however, of the button 50 being defective or removed, or of the closure member 41 being lifted off the seat 28 while there is a vacuum in the pipe 11, the large air spaces 75 surrounding the member 41 offer ample access to the atmosphere to prevent a sufficiently low pressure developing in the upper end of the delivery tube 32 to suck water from the flush tank 13 upwardly into the pipe 11.

Another advantage of the invention is to be found in the ready removability and ajustability of the fulcrum mount 57 without tools being required for this. The opportunity is thus afforded the average unskilled home owner to assemble or disassemble the assembly 10 and make repairs or replace worn parts when necessary and without having to call a plumber.

The angular adjustability of the fulcrum mount 57 on the ball cock 20 permits the pipe 11 to be tightly installed in hole 15 of tank bottom 12 and the ball cock 20 screwed tightly onto threads 18 on the upper end of pipe 11 without any thought being given to the orientation of the fulcrum mount. The latter is simply applied afterward in its proper orientation.

While only a single embodiment of the invention is disclosed herein, it is to be understood that many modifications may be made in this without departing from the spirit of the invention or the scope of the appended claims.

The claims are:

1. In a flush tank valve for controlling the escape of water from a pressure water supply pipe, the combination of: a valve seat base adapted to connect with said pipe and having a valve seat to which water flows under pressure from said pipe; a tube surrounding said base and fixed in concentric outwardly spaced relation with said base; a valve member slidable in said tube whereby said seat is closed when said member is pressed downward thereagainst; a float actuated lever having one end thereof poised over the center of said valve member, for depressing the latter; and a lever mount clamp pivotably supporting said lever on a horizontal axis and having means for clamping onto said tube with said lever disposed as aforesaid in any desired radial plane containing the axis of said member.

2. A combination as in claim 1 in which said tube is provided with an external annular flange; and means on said clamp for selectively gripping a selected section of said flange for securing said clamp on said tube.

3. A combination as in claim 2 in which said flange has an annular groove in its upper face; an arcuate hook extending from said clamp into said groove; and manual lever means on said clamp for engaging said flange from beneath to grip said flange between said hook and said lever means.

4. In a flush tank valve adapted to be mounted on the upper end of a pressure water supply pipe, the combination of: a valve seat base having a threaded receptacle for screwing on the upper end of said pipe, a valve seat, and a bore communicating between the interior of said pipe and said valve seat, said valve seat being concentrically related with said pipe; a cylindrical tube surrounding said valve seat base and a substantial portion of said pipe; means for supporting said tube in concentric relation with said seat base and pipe; a valve member comprising an inverted cup disposed in covering relation with said seat and spaced radially therefrom, said valve member being slidable within a portion of said tube disposed about said seat base; a button provided on said valve member in alignment with said seat, said button engaging and closing said seat when said member is shifted downwardly; a series of concentric screens occupying the space between said cup and said seat to act as baffles to diminish the speed and decrease the noise of the water discharged between said seat and said button; and operating means mounted on the upper end of said tube for applying downward pressure on said valve member to press the same against said valve seat to close said valve and, by relaxation of said pressure, permitting said valve to open, the water discharged impinging against said valve member causing it to reverse direction and flow between said pipe and said tube.

5. A combination as in claim 4 in which said valve seat base is tapered toward said seat, said tapered base lying within said cup whereby the free space within said cup occupied by said screens decreases progressively in cross sectional area from the top to the bottom of said cup.

6. In a flush tank valve adapted to be mounted on the upper end of a pressure water supply pipe, the combination of: means forming a valve seat on the upper end of said pipe; a tubular valve housing shell; means for mounting said shell concentrically on said pipe; an inverted cup slidable vertically within an upper portion of said shell and freely rotatable therein through a wide angle, said cup overlying said valve seat; a closure member centrally provided within said cup for engaging and closing said seat when said cup is moved downwardly in said shell float actuated mechanism for depressing said cup to close said valve or releasing said cup from downward pressure to permit said valve to open; and a refill pipe mounted on said cup to communicate with the interior of said cup and extend laterally therefrom over the upper end of said shell, the choice of the horizontal angle at which said refill pipe extends from said valve being readily selected by rotation of said cup within said shell.

7. A combination as in claim 6 in which said cup is radially spaced inwardly from said shell to allow air to freely pass downwardly between said shell and said cup; and flanges provided on said cup and engaging said shell to centralize said cup within said shell while allowing said shell freedom to slide vertically or rotate within said shell.

8. A combination as in claim 6 in which said valve seat means includes a receptacle internally threaded for screwing onto said water supply pipe and in which said shell mounting means includes radial webs uniting said shell and said receptacle.

9. A combination as in claim 8 in which quickly demountable means is provided for mounting said float actuated mechanism on a limited portion of the upper edge of said tubular housing shell, and in which means is provided for mounting a hush tube in concentric relation with said water supply pipe and with the upper end of said hush tube connecting with the lower end of said tubular housing shell.

10. In a flush tank valve, the combination of: a valve vase providing a vertical water passage which terminates at its upper end in a valve seat; a tubular valve housing shell; means for mounting said shell concentrically on said base, said means providing a substantially annular discharged-water passage downwardly between said shell and said base; an inverted cylindrical cup having external flanges which extend substantial distances radially therefrom and fit translatable within said shell whereby said cup is slidable vertically in said shell in concentric relation therewith while providing a substantial circumferential vertical air passage opening downwardly from the atmosphere to the space at the lower end of said cup between said valve base and said tubular housing shell; a closure member provided centrally within said cup for engaging and closing said seat when said cup is moved downwardly in said shell; a refill pipe mounted on an upper portion of said cup and extending laterally over the upper end of said shell, said cup being freely rotatable in said shell through a wide angle to give choice of the horizontal direction in which said refill pipe extends from said valve; and float actuated mechanism for depressing said cup to close said valve or for releasing said cup from downward pressure to permit said valve to open.

References Cited in the file of this patent

UNITED STATES PATENTS

| | | |
|---|---|---|
| 1,294,908 | Hill | Feb. 18, 1919 |
| 1,606,274 | Utley | Nov. 9, 1926 |
| 1,649,620 | Siefen | Nov. 15, 1927 |
| 2,003,380 | Masterson | June 4, 1935 |
| 2,312,654 | Langdon | Mar. 2, 1943 |
| 2,430,152 | Wiley | Nov. 4, 1947 |
| 2,444,958 | Smith | July 13, 1948 |
| 2,469,617 | Tippett | May 10, 1949 |
| 2,607,364 | Smith | Aug. 19, 1952 |
| 2,791,235 | Smith | May 7, 1957 |

UNITED STATES PATENT OFFICE
CERTIFICATION OF CORRECTION

Patent No. 2,967,542                         January 10, 1961

Bernard B. Einer

It is hereby certified that error appears in the above numbered patent requiring correction and that the said Letters Patent should read as corrected below.

Column 5, line 59, after "shell" insert a semicolon; column 6, line 25, for "vase" read -- base --; line 32, for "translatable" read -- slidably --; line 33, for "slidable" read -- translatable --.

Signed and sealed this 6th day of June 1961.

(SEAL)
Attest:

ERNEST W. SWIDER                         DAVID L. LADD

Attesting Officer                            Commissioner of Patents